March 15, 1960

W. A. EHLERT ET AL 2,928,304

CUT-OFF APPARATUS

Filed Feb. 7, 1956

INVENTORS
WILLIAM A. EHLERT
LEO D. MERSEK

BY

ATTORNEYS

March 15, 1960 W. A. EHLERT ET AL 2,928,304
CUT-OFF APPARATUS
Filed Feb. 7, 1956 9 Sheets-Sheet 5

INVENTORS
WILLIAM A. EHLERT
LEO D. MERSEK
BY Hudson, Houghton,
Williams, David & Hoffmann
ATTORNEYS March 15, 1960  W. A. EHLERT ET AL  2,928,304
CUT-OFF APPARATUS Filed Feb. 7, 1956  9 Sheets-Sheet 6

INVENTORS
WILLIAM A. EHLERT
LEO D. MERSEK
BY
ATTORNEYS

March 15, 1960 W. A. EHLERT ET AL 2,928,304
CUT-OFF APPARATUS
Filed Feb. 7, 1956 9 Sheets-Sheet 7

INVENTORS
WILLIAM A. EHLERT
LEO D. MERSEK
BY
Hudson, Doughton,
Williams, David & Hoffmann
ATTORNEYS

INVENTORS
WILLIAM A. EHLERT
LEO D. MERSEK
BY
ATTORNEYS

United States Patent Office 2,928,304
Patented Mar. 15, 1960

2,928,304

CUT-OFF APPARATUS

William A. Ehlert, South Euclid, and Leo D. Mersek, Euclid, Ohio, assignors to The Ajax Manufacturing Company, Euclid, Ohio, a corporation of Ohio Application February 7, 1956, Serial No. 563,935

8 Claims. (Cl. 83—205)

This invention relates to cut-off apparatus for cutting desired lengths from the leading end of rod or wire stock being advanced and, as one of its objects, aims to provide a machine for this purpose which is compact and durable and which will function smoothly and efficiently while operating at a relatively high-speed production rate.

Another object of the invention is to provide novel cut-off apparatus having an intermittently actuated cutter means and a stock gauge engageable and movable by the stock being fed, and in which control means controlling the actuation of the cutter means includes switch means responsive to the movement of the stock gauge by the stock.

A further object of the invention is to provide novel cut-off apparatus having a stock gauge movable by the stock being fed and a cutter means intermittently actuated by a rotatable shaft and a cutter slide operably connected with the latter, and in which control means controlling the starting and stopping of the cutter means includes a first switch means responsive to the movement of the gauge by the stock and a second switch means responsive to the rotation of the shaft.

Yet another object is to provide a novel cut-off apparatus having an intermittently actuated cutter slide and a stock gauge movable first by the stock being fed and thereafter movable away from the stock by axial movement of a gauge rod means having abutment means thereon, and in which stock gauge position control means actuated directly by the movement of the cutter slide cooperates with the abutment means of the gauge rod means.

As still another object, this invention provides novel cut-off apparatus of the character mentioned above in which the abutment means of the gauge rod means comprises spaced abutment elements and the stock gauge position control means comprises swingably supported means disposed between the abutment elements and movable by the cutter slide from an initial or stop position to a second or release position.

It is also an object of this invention to provide novel cut-off apparatus of the above-indicated character in which the swingably supported means of the stock gauge position control means comprises a pair of strap members straddling the gauge rod means and supported for substantially parallel movement by swingable links.

Additionally, this invention provides novel cut-off apparatus in which a rockshaft supporting a cover for a cut-off chamber is actuated directly from the cutter slide for causing opening movements of the cover during the cutting stroke.

The invention can be further briefly summarized as consisting in certain novel combinations and arrangements of parts hereinafter described and particularly set out in the claims hereof.

In the accompanying sheets of drawings forming a part of this specification.

As one practical embodiment of the invention, the drawings show cut-off apparatus 10 as being a part of a combined drawing, straightening and cut-off machine 11, of the kind illustrated in earlier U.S. Patents 2,310,914 and 2,310,916 granted February 9, 1943, and which includes a common base plate 12. The cut-off apparatus 10 is mounted on the base plate 12 adjacent the straightening mechanism 13 and receives the rod or wire stock 14 from the latter. The cut-off apparatus 10 is provided with a pair of suitably driven cooperating feed rolls 15 and 16 on the end thereof adjacent the straightening mechanism 13 and which rolls operate to feed the stock 14 into the cut-off apparatus.

Figure 3:
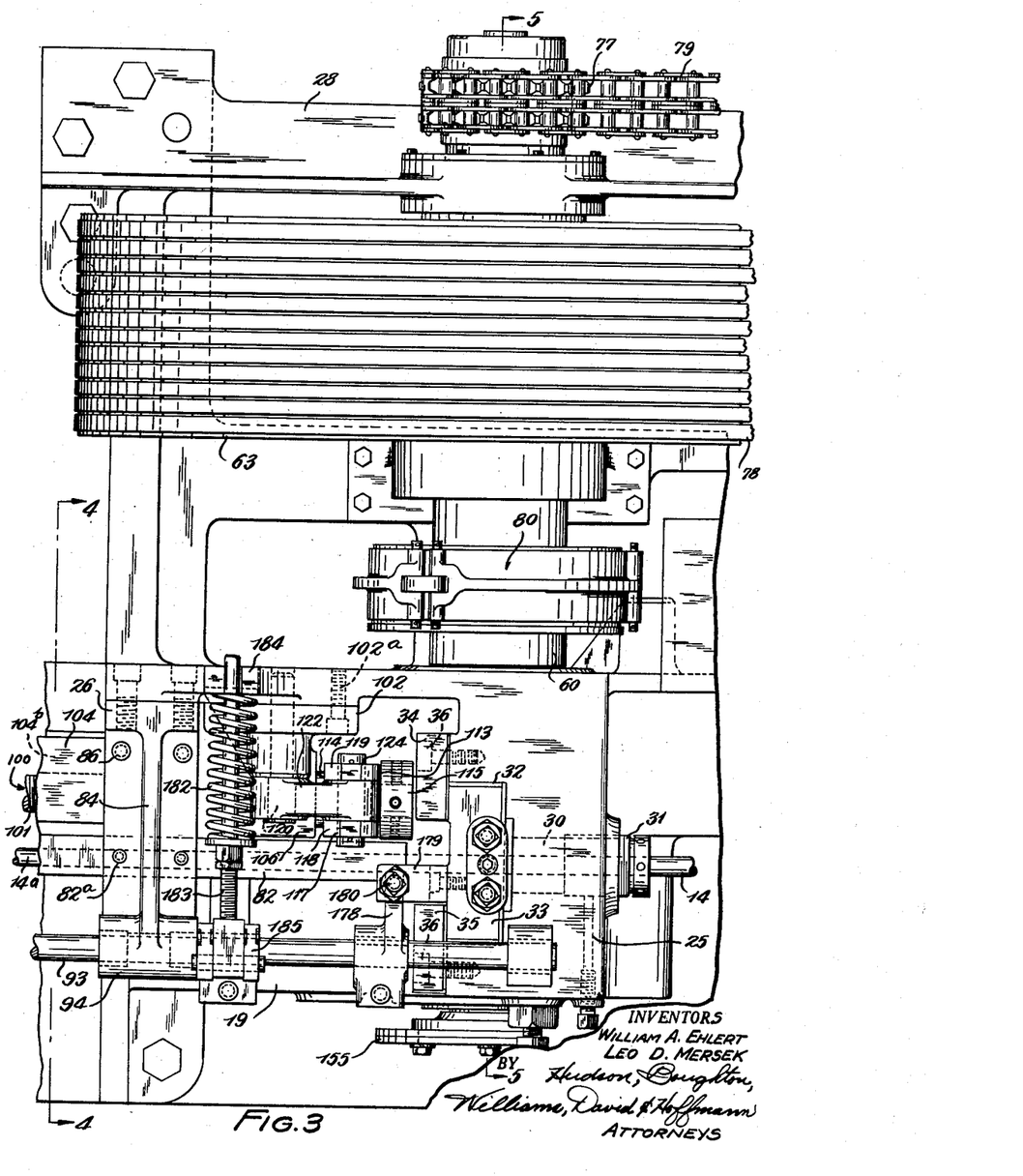
Fig. 3 is a top plan view of the portion of the apparatus shown in Fig. 2.
Figure 5:
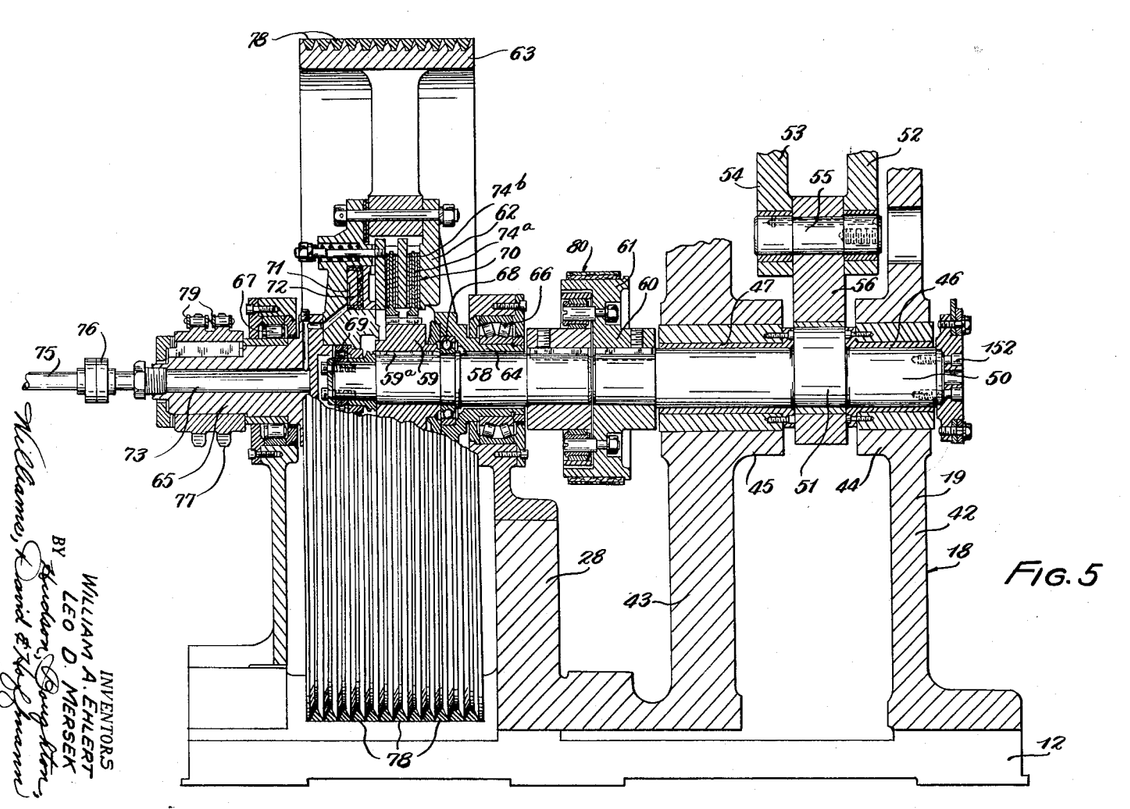
Fig. 5 is a partial transverse vertical section taken on section line 5—5 of Fig. 3.
Figure 6:
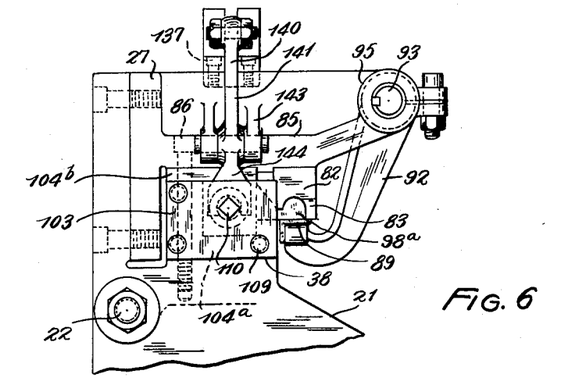
Fig. 6 is a partial end elevation of the remote end of the apparatus towards which the stock is being fed.
Figure 7:
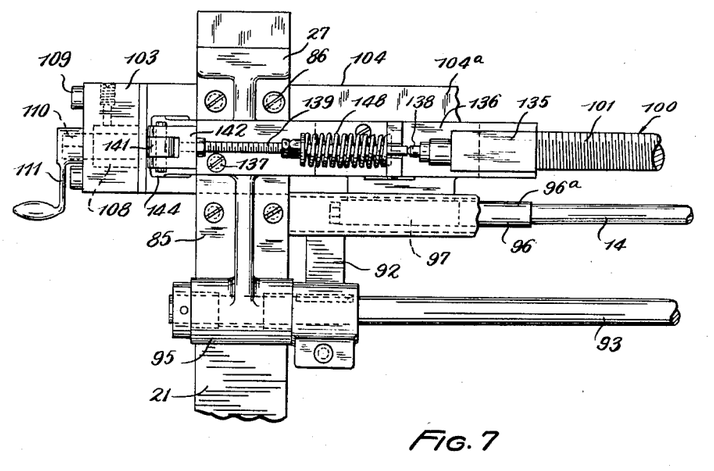
Figs. 7 and 8 are partial plan and side views respectively of such remote end.
Figure 8:
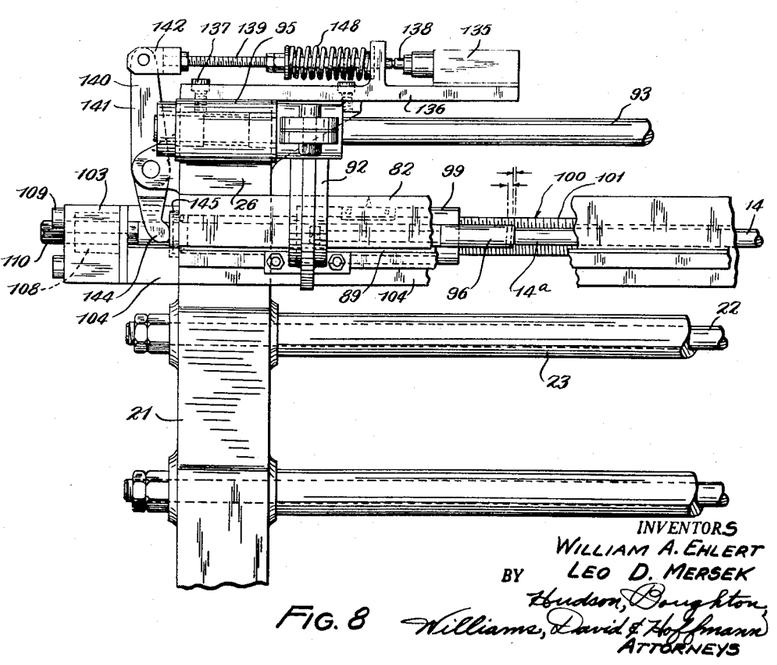

The cut-off apparatus 10 is provided with a frame 18 which comprises a main section 19 secured to the base plate 12 by anchor bolts 20, and an end section 21 which is connected to the main section 19 by a plurality of tie rods 22 extending through spacer sleeves 23. The frame 18 includes a head portion 25 on the stock-receiving end thereof and carried by the main frame section 19. The frame 18 also includes a pair of longitudinally spaced brackets 26 and 27 which are mounted respectively on the frame sections 19 and 21 adjacent the top thereof and a pair of flat support ledges 37 and 38 beneath these brackets. The purpose of the brackets 26 and 27 and of the ledges 37 and 38 will appear hereinafter. As shown in Figs. 3 and 5, the main frame section 19 is also provided with a laterally projecting outboard clutch and drive shaft mount 28, which will be further described hereinafter.

Figure 1:
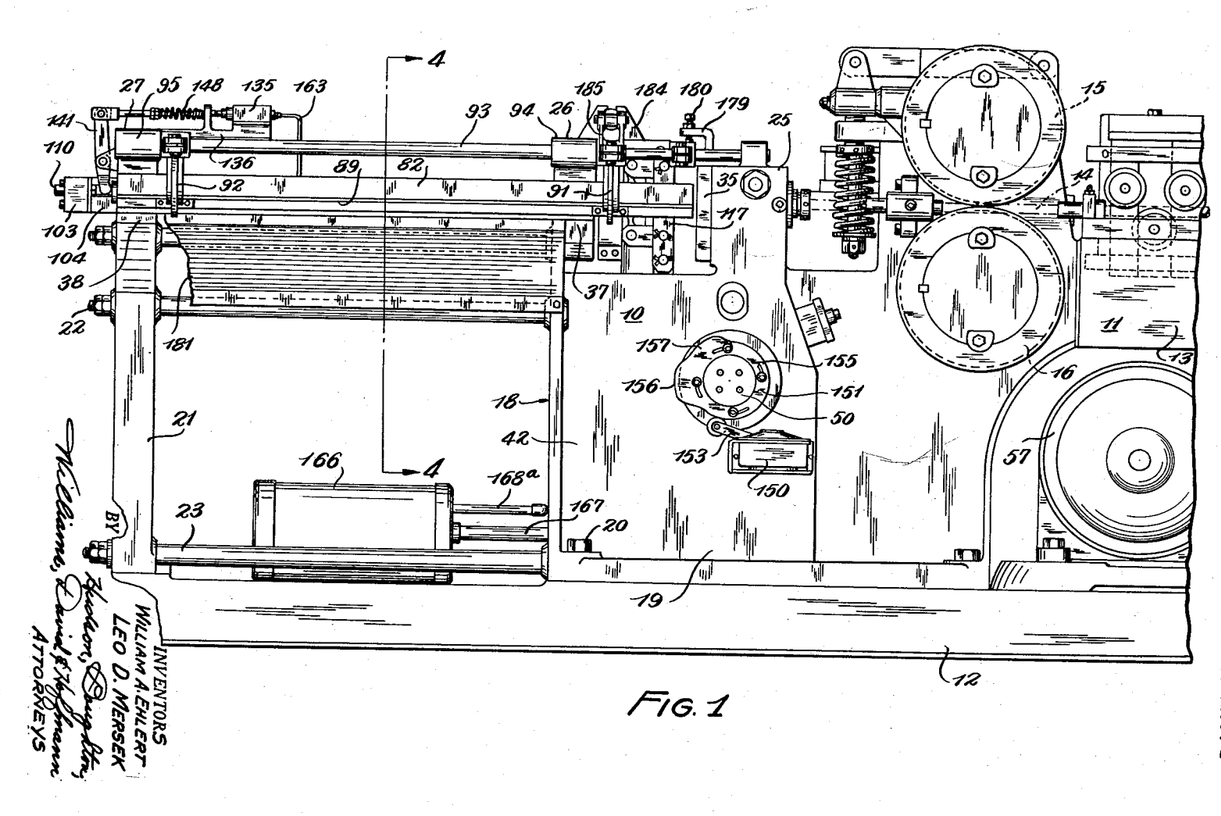
Fig. 1 is a side elevation of cut-off apparatus embodying the present invention.
Figure 2:
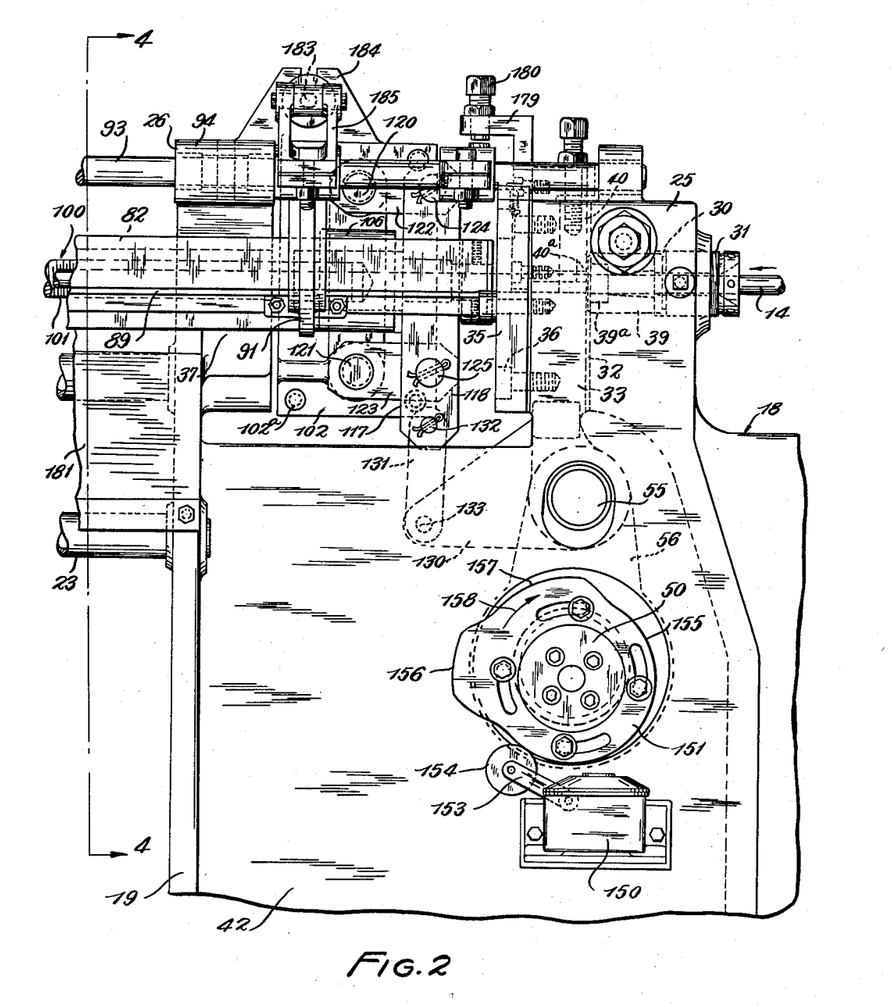
Fig. 2 is a partial side elevation corresponding with a portion of the apparatus of Fig. 1 and showing the same on a larger scale.

As best shown in Figs. 2 and 3 of the drawings, the head portion 25 of the frame section 19 is provided with a stock feed passage 30 having a guide bushing 31 mounted therein for receiving and guiding the stock 14. The head portion 25 is also provided with a substantially vertical guideway 32 which extends across the stock passage 30 and in which a cutter slide 33 is reciprocably operable. Cover plates 34 and 35 secured to the head portion 25 by screws 36, overlie portions of the guideway 32 and retain the slide 33 therein.

Figure 10:
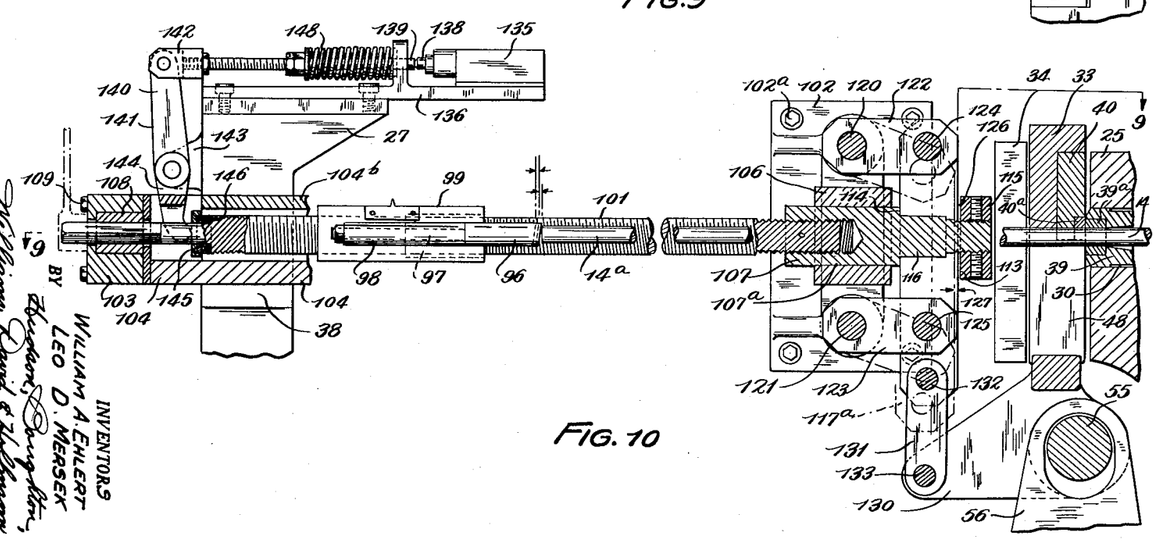
Fig. 10 is an elevational view partially in vertical section and somewhat diagrammatic in form and further illustrating the stock gauge position control means, the view being taken substantially as indicated by section line 10—10 of Fig. 9.

The cutting means of the apparatus 10 severs stock sections of a desired length in succession from the leading end of the stock 14 being fed thereto and comprises a hollow stationary cutting die 39 and a movable cutting die 40 carried by the cutter slide 33 (see Figs. 2 and 10). The stationary die 39 is located in the feed passage 30 of the head portion 25 and includes a hardened insert 39$^a$. The movable die 40 is provided with a hardened insert 40$^a$ and is movable transversely of the feed passage 30 so as to have a cutting stroke during each downward travel of the cutter slide 33 in the guideway 32.

Figure 4:
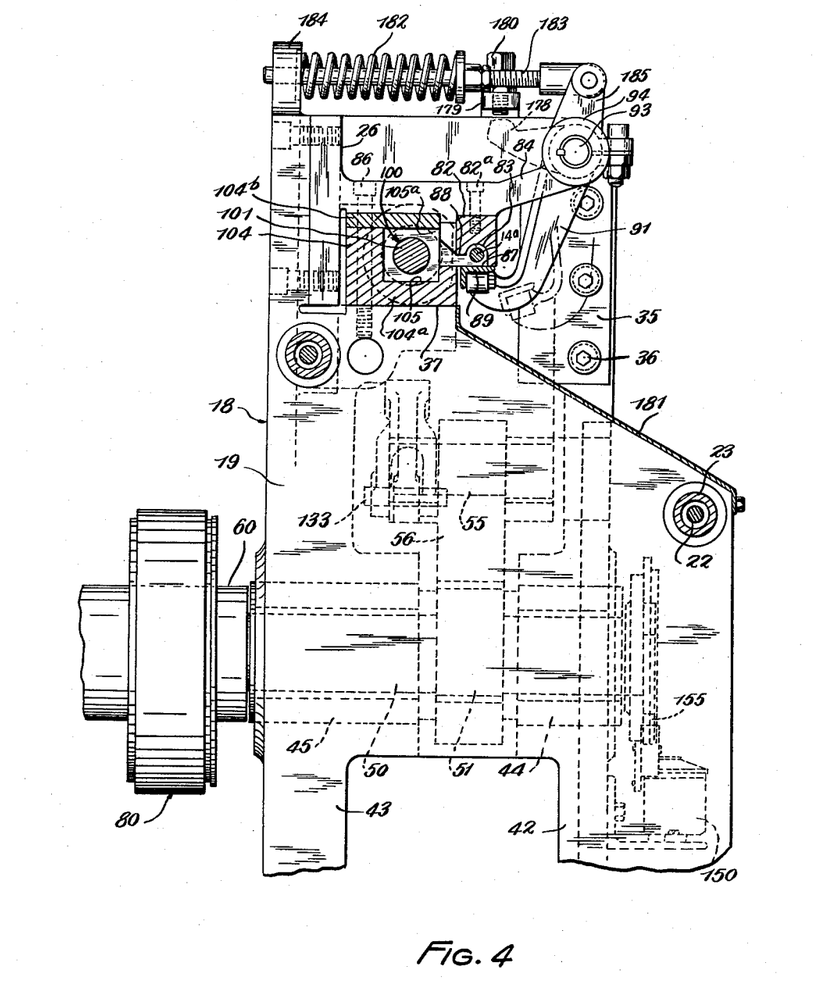
Fig. 4 is a partial transverse vertical section taken through the apparatus as indicated by section line 4—4 of Figs. 1, 2 and 3.

As shown in Figs. 4 and 5, the frame section 19 has laterally spaced upright walls 42 and 43 provided with aligned bearing bosses 44 and 45 in which bushing sleeves 46 and 47 are mounted. A cutter actuating shaft 50 is rotatably mounted in the bushing sleeves 46 and 47 and has an eccentric or crank 51 thereon located between the adjacent ends of these sleeves.

The cutter slide 33 has an opening 48 therein for movement of the stock 14 therethrough and, at its lower end, is provided with spaced arms 52 and 53 forming a forked portion 54 carrying a transverse pivot pin 55. The cutter slide 33 is reciprocated in the guideway 32 by the eccentric 51 through a connecting rod or link 56 whose upper end extends between the arms 52 and 53 and is pivoted on the pin 55. The lower end of the link 56 is pivoted on and embraces the eccentric 51.

The driving torque for the cutter actuating shaft 50 is supplied thereto by an aligned drive shaft 58 having a rotatable inner clutch member or hub 59 secured thereto as by means of the key 59$^a$. The adjacent ends of the cutter shaft 50 and the drive shaft 58 are connected by a flexible coupling 60 which carries a brake drum 61. An outer clutch member or housing 62 is formed by the hub portion of a drive pulley 63 and is rotatable about the clutch hub 59.

The clutch housing 62 includes an axial sleeve 64 surrounding the drive shaft 58 and an axial journal projection 65 aligned with the drive shaft. The pulley 63 and the clutch housing 62 are supported for rotation by the clutch housing having the sleeve and journal portions 64 and 65 thereof mounted in bearings 66 and 67 of the outboard mount 28. The bearing 66 is preferably a self-aligning bearing. The drive shaft 58 extends through the sleeve 64 and is rotatably supported by axially spaced bearings 68 and 69 mounted in the clutch housing 62.

The clutch members 59 and 62 are components of a clutch device 70 which also comprises sets of cooperating friction elements or disks 74$^a$ and 74$^b$ carried respectively by these clutch members. The clutch device 70 also includes an annular cylinder 71 in the housing 62 and an annular piston 72 movable in this cylinder for applying pressure to the clutch elements 74$^a$ and 74$^b$ to thereby render the clutch device effective for connecting the drive pulley 63 with the drive shaft 58. Actuating fluid for the clutch device 70 is supplied to and released from the annular cylinder 71 through a passage which includes an outer axial passage 73 formed in the journal projection 65. A fluid pressure conduit 75 is connected with the axial passage 73 by a slip coupling 76.

The pulley 63 is driven from a suitable power source, such as the pulley of an electric motor 57, through a belt 78. The pulley 63 rotates freely about the inner clutch member 59 until the clutch device 70 is rendered effective or energized by a pressure fluid supplied thereto through the axial passage 73, whereupon the pulley is drivingly connected with the drive shaft 58 for transmitting torque to the cutter shaft 50. When the clutch device 70 is de-energized by the release of the pressure fluid from the cylinder 71 through the passage 73, the supply of driving torque to the cutter shaft 50 is interrupted and the pulley 63 then rotates freely about the inner clutch member 59. A sprocket 77 fixed on the journal projection 65 can be used to drive the feed rolls 15 and 16 through a chain 79.

Figure 11:
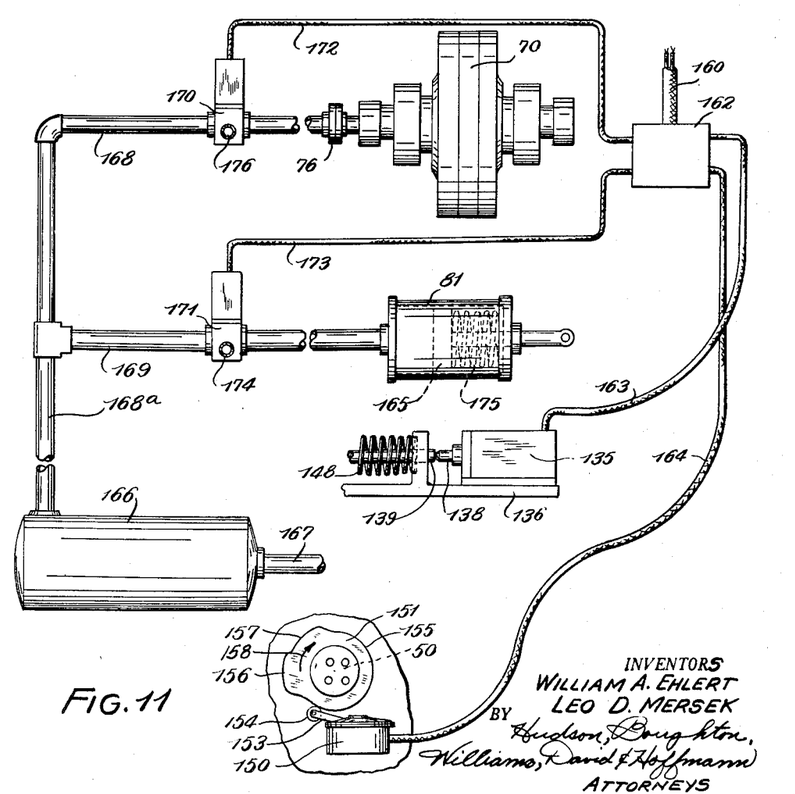
Fig. 11 is a diagram further illustrating the control means for controlling the actuation of the cutter.
Figure 12:
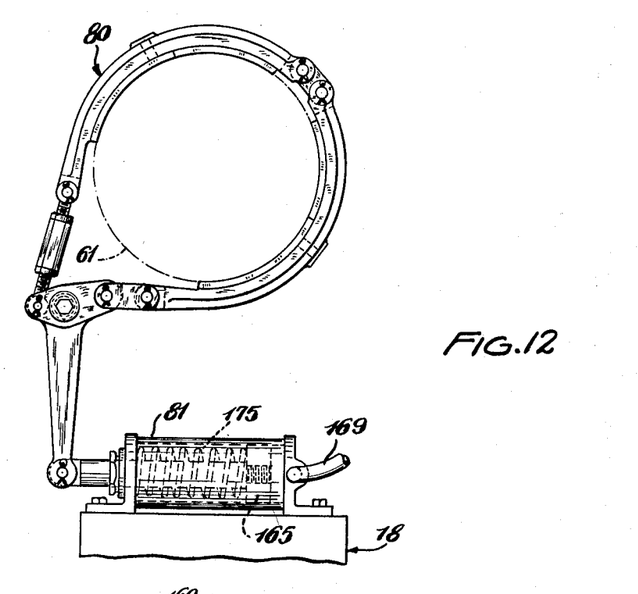
Fig. 12 is a detached fragmentary elevational view showing the brake device of the machine.

Each revolution of the cutter shaft 50 produces one operating cycle of the cutter slide 33 comprising a downward cutting stroke and an upward return stroke. It is desirable that the movement of the cutter slide be stopped at the completion of the upward return stroke so that the next length of stock 14 can be fed through the opening 48 of the cutter slide. Such stopping of the cutter slide is produced by a conventional brake device comprising a friction means 80 cooperating with the brake drum 61 and which friction means is rendered effective and ineffective by control means described hereinafter and which includes a brake cylinder 81 (see Figs. 11 and 12) adapted to be supplied with pressure fluid.

The cut-off apparatus 10 is provided with an elongated hollow feed box 82 having a longitudinal passage therein forming a cutting chamber 83. The feed box 82 extends longitudinally with the cutting chamber 83 thereof aligned with the feed passage 30 and is mounted on the frame 18 by being connected to the under side of the arms 84 and 85 of the brackets 26 and 27 by the screws 82$^a$. The cutting chamber 83 has a longitudinal bottom opening 87 facing downwardly and a longitudinal side slot 88.

The bottom opening 87 is closed by a movable cover 89 which is swingably supported by a pair of longitudinally spaced levers 91 and 92. The levers 91 and 92 are mounted on, and actuated by, a rockshaft 93 which is journalled in bearing bosses 94 and 95 of the brackets 26 and 27.

The stock 14 is fed into the cutting chamber 83 and the length of the stock section 14$^a$ to be severed is determined by the position of a stock gauge 96 against which the stock is fed. The stock gauge 96 is formed by the hardened head 96$^a$ of a bolt 97 which is mounted in a bracket portion 98 (see Fig. 9) of a nut member 99. The stock gauge 96 is located in the cutting chamber 83 and is supported therein by a web-shaped arm 98$^a$ of the bracket portion 98 and which arm extends through the longitudinal side slot 88 of the cutting chamber 83. The nut member 99 is mounted on a gauge rod means 100 which includes a rotatable longitudinal adjusting screw 101 extending through the nut member.

The rod means 100 is supported in an adjacent parallel relation to the cutting chamber 83 by a pair of support brackets 102 and 103 and extends longitudinally through an elongated guide box 104. The support bracket 102 is located between the bracket 26 and the head portion 25 of the main frame section 19. The bracket 102 is secured to the frame section 19 by suitable screws 102$^a$ and includes a hollow bearing boss 106.

The guide box 104 extends parallel with the feed box 82 and spans the space between the frame sections 19 and 21 with its end portions supported on the flat ledges 37 and 38. These end portions of the guide box are fixed in place between the ledges 37 and 38 and the under side of the arms 84 and 85 of the brackets 26 and 27 by relatively long screws 86.

The guide box 104 comprises a bar 104$^a$ of substantially L-shaped cross section, as shown in Fig. 4, and a cover plate 104$^b$ defining with this bar a longitudinal guide passage 105 of a substantially square cross-sectional shape. The nut member 99 of the gauge stop 96 is non-rotatably slidable in this guide passage. The guide box 104 has a longitudinal side opening 105$^a$ facing the side slot 88 of the cut-off chamber 83 and which accommodates the arm 98$^a$ of the nut member 99.

One end of the rod means 100 is formed by an abutment member 107 having a journal portion 107$^a$, pinned or otherwise secured to the screw 101, and slidable in the bearing boss 106. The other end of the rod means 100 projects from the guide box 104 and is rotatably mounted in the auxiliary support bracket 103 by a bearing sleeve 108. The auxiliary bracket 103 is mounted on the end of the guide box 104 by means of the screws 109.

The end of the screw 101 which extends through the bearing sleeve 108 is in the form of a non-circular stem, such as a square stem 110, to which a suitable tool or crank handle 111 can be applied for rotating the screw. Such rotation of the screw 101 shifts the nut member 99 therealong and in passage 105 of the guide box 104 for positioning the stock gauge 96 longitudinally of the cutting chamber 83 in accordance with the length of stock section 14ª desired to be cut.

The stock gauge 96 is also movable longitudinally in the cutting chamber 83 as a part of the control functioning of the apparatus 10. When the stock gauge 96 is engaged by the stock 14, it is shifted by the latter in the direction in which the stock is being fed to thereby impart a longitudinal control movement to the rod means 100. The stock gauge 96 is also movable longitudinally of the cutting chamber 83 in the stock feeding direction for disengaging the same from the end of the stock 14 during the cutting operation, so that the severed stock section can drop freely out of the cutting chamber when the cover 89 is swung open. The initial movement of the stock gauge 96 by the stock 14 is utilized in starting the operation of the cutting means in a novel manner which will be described next.

The rod means 100 carries a pair of spaced-apart abutment elements or shoulders 113 and 114. The abutment element 113 is formed by one face of a nut member 115 which is mounted on a stem projection 116 of the abutment member 107. The abutment element 114 is formed by the adjacent end face or shoulder of the cylindrical portion 107ª of the abutment member 107. The abutment member 107 and the nut member 115 thus form a head means on the screw 101 and which carries the spaced-apart abutment elements or shoulders 113 and 114.

A gauge position control means cooperates with the abutment elements 113 and 114 for controlling the position of the stock gauge 96 in the cutting chamber during performance of the cutting cycle and comprises a movable stop or thrust member in the form of a yoke means 117 straddling the stem portion 116 and formed by a pair of upright parallel straps 118 and 119. Above and below the bearing boss 106 the bracket 102 is provided with projecting pivot pins 120 and 121 from which the straps 118 and 119 are swingably supported by links 122 and 123. The links 122 and 123 have their free or swingable ends disposed between the straps 118 and 119 and connected with the latter by pivot pins 124 and 125.

Figure 9:
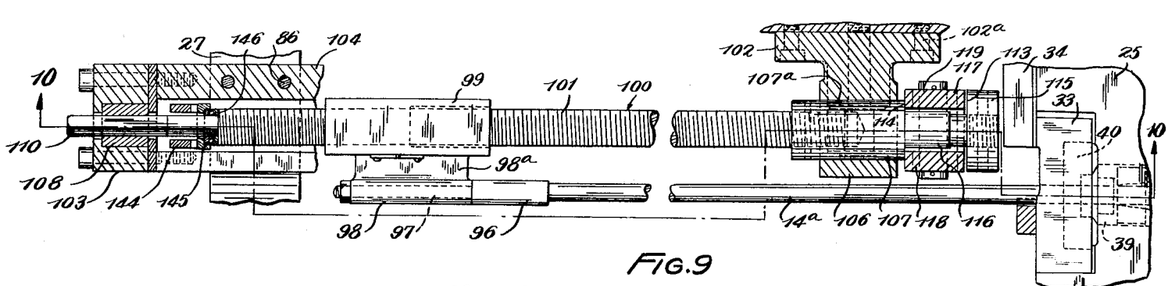
Fig. 9 is a plan view partially in horizontal section and somewhat diagrammatic in form and further illustrating the stock gauge position control means, the view being taken substantially as indicated by section line 9—9 of Fig. 10.

From the arrangement and construction just above described for the yoke means 117, it will be seen that this yoke means is movable from an initial position shown in full lines in Fig. 10 to a broken-line position 117ª conveniently referred to as a release position, by the downward swinging of the links 122 and 123 about the pivot pins 120 and 121. When the yoke 117 is in its upper or initial position, which can be conveniently referred to as a stop position, the edges of the straps 118 and 119 on one side of the latter are presented toward the nut member 115 but are spaced from the abutment element 113 by an intervening control space 126. The control space 126 permits the above-mentioned movement of the stock gauge 96 by the stock 14, which is a movement toward the left as seen in Figs. 9 and 10 and is limited in amount by the width of this control space.

The movement of the yoke means 117 from its full-line stop position to its broken-line release position 117ª of Fig. 10 by the downward swinging of the links 122 and 123, causes the opposite edges of the straps 118 and 119 to engage and apply thrust to the abutment element 114 for the purpose of imparting a longitudinal movement to the screw 101 for disengaging the gauge 96 from the stock 14. Because of the swingable mounting of the yoke means 117 by the links 122 and 123, the yoke means will move through a control distance 127 which is represented by the space between the dimensional arrows shown in Fig. 10. This control distance represents the extent of longitudinal movement imparted to the stock gauge 96 for moving the latter away from the end of the stock 14. The control movement represented by the distance 127 is a parallel movement component of the straps 118 and 119 resulting from the downward swinging thereof, inasmuch as the polygonal arrangement represented by the axes of the pivot pins 120, 121, 124 and 125 is that of a parallelogram.

The actuation of the yoke means 117 between its stop position and its release position is produced by motion supplied thereto directly from the cutter slide 33. For this purpose the arm 53 of the forked portion 54 of the cutter slide carries a bracket projection 130 to which the lower end of the yoke means 117 is connected by a link 131 and pivot pins 132 and 133. Thus, when the cutter slide 33 is in its upper position and at rest for the feeding of the stock 14 into the cutting chamber 83, the yoke means 117 will be in its upper full-line position, that is to say its stop position, with the intervening control space 126 separating the abutment element 113 from the yoke means.

When the leading end of the stock 14 engages and moves the stock gauge 96, the control space 126 is taken up and further movement of the stock gauge at this time is then prevented by the engagement of the abutment element 113 with the yoke means 117. This extent of control movement of the screw 101 is utilized to start the actuation of the cutter slide 33 in the manner which will be presently described. As the cutter slide 33 moves downwardly through the cutting stroke for severance of the desired stock section by the cutting dies 39 and 40, the yoke means 117 moves parallel to itself through the control distance 127 to thereby move the stock gauge away from the stock section being cut off, as already mentioned above.

The operation of the cutter slide 33 is an intermittent operation and is started and stopped by a sequential actuation of the clutch device 70 and the brake means 80. The energization of the clutch device 70 is responsive to the above-described actuation of the stock gauge 96 by the stock being fed. For this purpose the longitudinal movement of the stock gauge and the screw 101 is utilized to cause actuation of a clutch control switch 135 for starting the rotation of the cutter shaft 50.

As shown in Figs. 9 and 10, the switch 135 is mounted on an auxiliary bracket 136 which is secured to the bracket 27 by the screws 137. The switch 135 is a normally open switch having an actuating stem 138 projecting therefrom and engageable by the adjacent end of a push-rod 139. The other end of the push-rod 139 is connected with the arm 140 of a lever 141 as by means of a yoke 142. The arm 140 is swingably mounted in a projection 143 of the bracket 27. The arm 144 of the lever 141 is a forked arm which straddles the outer end portion of the screw 101 projecting from the guide box 104 and is engageable with a thrust bearing 145 which is mounted on the screw adjacent a shoulder 146 of the latter.

From the arrangement just described for the control switch 135, it will be seen that when the stock gauge 96 is actuated by the stock 14 the longitudinal movement of the screw 101 toward the left will cause the thrust bearing 145 to act against the lever arm 144, thereby swinging the lever 141 in a clockwise direction and causing the push-rod 139 to actuate the switch stem 138 to close the contacts contained in the switch 135. A compression spring 148 surrounding the push-rod 139 is effective on the latter to normally urge the push-rod in a direction to release the switch plunger 138 and permit opening of the contacts of the switch 135. The spring 148 also returns the stock gauge 96 to its initial position by moving the abutment element 114 into engagement with the yoke means 117 when the latter has been returned to its stop position by the upward return movement of the cut-off slide 33.

The actuation of the cutter shaft 50 is also controlled by a second switch device 150 which is mounted on the side wall 42 of the main frame section 19 and associated with a rotary cam 151 secured on the end of the cutter shaft by the screws 152. The switch device 150 has a swingable actuating arm 153 which is movable to a plurality of different control positions and carries a cam follower in the form of a roller 154.

The cam 151 is of a contour to provide low and high cam portions 155 and 156 and an intermediate cam portion 157. This cam is shown in Fig. 2 in its initial or stopped position corresponding with the extreme upper rest position of the cutter slide 33 and is rotatable in a clockwise direction as indicated by the arrow 158.

The switch device 135 is electrically connected with suitable relay mechanism contained in a relay box 162 by a conductor cable 163. The switch device 150 is also connected with the relay mechanism of the box 162 by a conductor cable 164. The relay mechanism of the box 162 is supplied with current from a suitable power source through a conductor cable 160.

The pressure fluid for actuating the piston 71 of the clutch device 70 and for actuating the piston 165 of the brake cylinder 81, such as compressed air, is obtainable from a suitable pressure source, such as a supply reservoir 166 which is connected with an available compressed air supply line by a conduit 167. The cylinder 71 of the clutch device 70 is connected with the reservoir 166 by a pipeline 168 and the brake cylinder 81 is connected with the reservoir 166 through a pipeline 169 and a portion 168a of the pipeline 168. The pipeline 168 to the clutch cylinder 71 is controlled by a solenoid valve 170 and the pipeline 169 to the brake cylinder 81 is controlled by solenoid valve 171. The solenoid valve 170 is electrically connected with the relay mechanism of the box 162 by a conductor cable 172 and the solenoid valve 171 is connected with such relay mechanism by a conductor cable 173.

The electric circuits of the switch devices 135 and 150 and of the solenoid valves 170 and 171 are such that when the switch 135 is closed in response to the actuation of the stock gauge 96 by the stock 14, the solenoid valve 171 will be actuated to supply fluid pressure to the cylinder 81 for releasing the brake 80 and the solenoid valve 170 will be opened to supply fluid pressure to the cylinder 71 for energizing the clutch device 70. Just prior to the close of the switch 135, the lever 153 of the switch device 150 is in its initial position corresponding with the stopped condition of the cutter slide, that is, in the position shown in Figs. 2 and 11 with the roller 154 resting on the low cam portion 155 at a point adjacent the high cam portion 156. While the switch arm 153 is in this initial position, the setting of the solenoid valve 171 is such that the brake cylinder 81 is in communication with the atmosphere through the exhaust port 174 of this solenoid valve and the brake device 80 is being maintained in its applied condition by compression spring 175 of the brake cylinder 81.

The energization of the solenoid valve 171 causes the exhaust port 174 to be closed and the supply pipe 169 to be placed in communication with the cylinder 81 for actuation of the piston 165 in opposition to the spring 175 to thereby release the brake 80. The energization of the clutch device 70 immediately following the release of the brake 80 starts rotation of the cutter shaft 50 thereby initiating the operating cycle of the cutter slide 33. By the time that the cutter slide has been moved downwardly through its cutting stroke and has been returned to its initial or rest position shown in Fig. 2, the intermediate cam portion 157 will arrive at a point beneath the roller 154 and will move the switch arm 153 to its intermediate position, thereby changing the electric circuits such that the setting of the solenoid valve 170 will be changed to one in which the supply of pressure fluid through the pipeline 168 will be cut off and the pressure fluid in the clutch cylinder 71 will be exhausted to atmosphere through the exhaust port 176 of this valve. Immediately thereafter the high cam portion 156 arrives under the roller 154 and moves the switch arm 153 to its second actuated position, thereby again changing the electric circuits such that the solenoid valve 171 will be shifted to cut off the supply of pressure fluid to the brake cylinder 81 and to connect the latter with the atmosphere through the exhaust port 174 to permit the brake device 80 to be reapplied by the spring 175.

The inertia of the moving parts of the machine is such that by the time that the brake device 80 stops the rotation of the cutter shaft 50, the cam 151 will have advanced to the point where the roller 154 of the switch arm 153 is seated against the low cam portion 155 with the switch arm back in its initial position. The cycle of operation described above leaves the cut-off apparatus 10 in a condition ready for the next forward feeding movement of the stock 14 into the cut-off chamber 83. From this cycle of operation it will be seen that each forward feeding of the stock into engagement with the stock gauge 96 automatically starts an operating cycle of the apparatus which includes one downward cutting stroke of the cutter slide 33 and an automatic stopping of the cutting means upon the completion of the cycle.

Figure 13:
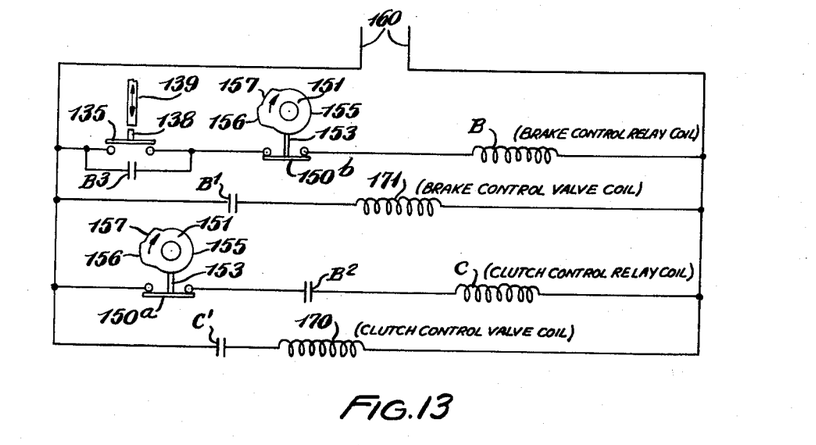
Fig. 13 is a schematic wiring diagram showing the electrical circuits for the control switches and solenoid valves of the machine.

The electric circuits serving the switch devices 135 and 150 and the solenoid valves 170 and 171 for carrying out the above-described cycle of operation are of a conventional form such as are represented in the diagram of Fig. 13. In this diagram the coil B is the magnet coil of a brake control relay and the coil C is the magnet coil of a clutch control relay. The switches $B^1$, $B^2$ and $B^3$ are a part of the brake control relay and are normally open switches which are closed upon energization of the relay coil B. The switch $C^1$ is a part of the clutch control relay and is a normally open switch which is closed upon energization of the relay coil C.

The switch $B^1$ is in series with and controls the magnet coil of the solenoid valve 171. The switch $B^2$ controls the magnet coil C of the clutch relay. The switch $B^3$ is a holding circuit switch which maintains the brake relay coil B energized when the switch 135 reopens due to the severed piece of stock dropping away from the stock gage 96. The switch $C^1$ controls the energization of the magnet coil of the solenoid valve 170.

The switch 150a is a part of the switch device 150 and also controls the clutch relay coil C. This switch is opened upon actuation of the switch arm 153 by the cam portion 157 to deenergize the clutch 70. The switch 150b is a part of the switch device 150 and also controls the brake relay coil B. This latter switch is opened when the switch arm 153 is actuated by the cam portion 156 to thereby cause deenergization of the brake relay to permit the spring 175 to reapply the brake 80.

In accordance with another feature of the cut-off apparatus 10, the opening of the cover 89 of the cutting chamber 83 to discharge the severed stock section therefrom is supplied to the rockshaft 93 directly from the cutter slide 33. For this purpose the rockshaft is provided with an arm 178 which is engageable by a bracket 179 of the cutter slide through an adjusting screw 180. Thus, during each downward cutting stroke of the slide 33, the arm 178 will be engaged by the screw 180 and rocked in a direction to swing the cover 89 to its open position shown in broken lines in Fig. 4.

The opening of the cover 89 permits the severed stock section to drop onto the inclined deflector plate 181 by which the stock section is directed into a suitable container standing alongside of the machine. The subsequent upward return movement of the cutter slide 33 releases the arm 178, whereupon the cover 89 is returned to its closed position by the action of a compression spring 182 on the rockshaft 93. As shown in Fig. 4, the spring 182 is disposed around a push-rod 183 and is seated against a lug 184 of the frame section 19 so as to exert a pushing force against an arm 185 of the lever 91.

From the accompanying drawings and the foregoing detailed description it will now be readily understood that this invention provides novel cut-off apparatus for severing sections of desired length from the leading end of wire or rod stock being fed to the apparatus. It will now also be understood that this cut-off apparatus is of a compact and practical construction capable of smooth and efficient operation for prolonged periods and at a relatively high speed production rate. Additionally, it will be seen that the control means utilizing automatically actuated switch devices responsive to movement of the stock gauge by the stock and to the rotation of the cutter shaft, will control the apparatus in a reliable and satisfactory manner such that the apparatus will not require the constant attention of an attendant but will continue to run as long as the stock 14 is fed thereto and will accommodate itself to the rate of feed at which the stock is supplied thereto.

Although the novel cut-off apparatus of this invention has been illustrated and described herein to a somewhat detailed extent, it will be understood, of course, that the apparatus is not to be regarded as being limited correspondingly in scope but includes all changes and modifications coming within the terms of the claims hereof.

Having thus described our invention, we claim:

1. In cut-off apparatus, a frame having a stock feed passage and an associated guideway, cutter means for severing stock being advanced in said passage including a cutter slide movable in said guideway and having an operating cycle comprising a cutting stroke and a return stroke, means for actuating said slide, a stock gauge spaced from said cutter means and being engageable and movable by said stock, means responsive to the movement of said gauge by said stock for rendering the slide actuating means effective, means responsive to the slide actuating means for causing stopping of said slide upon the completion of each such operating cycle thereof, an axially movable rod means connected with said stock gauge and having abutment means thereon, a stock gauge position control means comprising a stop having a stop position engageable by said abutment means for establishing an initial position for said gauge and being movable away from said stop position for subsequently imparting movement through said rod means to said gauge to disengage the latter from said stock, substantially parallel link members pivoted on said frame and swingably supporting said stop for movement of the latter in a substantially parallel relation to itself during movement of the stop to and from said stop position, and means for causing the swinging of the link members and the parallel movement of said stop in response to the actuation of said slide.

2. In cut-off apparatus, a frame having a stock feed passage and an associated guideway, feed means for advancing stock along said passage, cutter means for severing said stock including a cutter slide movable in said guideway and having an operating cycle comprising a cutting stroke and a return stroke, means for actuating said slide, a stock gauge spaced from said cutter means and being engageable and movable by said stock, means responsive to the movement of said gauge by said stock for rendering the slide actuating means effective, means responsive to said slide actuating means for causing stopping of said slide upon the completion of each such operating cycle thereof, an axially movable rod means connected with said stock gauge and having spaced abutment elements thereon, a thrust member extending between said abutment elements, swingable link means mounting said thrust member on said frame for movement substantially parallel to itself while in engagement with one of said abutment elements for imparting axial movement to said rod means in a direction to disengage said gauge from the stock, and means for causing the parallel actuation of said thrust member in timed relation to the actuation of said slide.

3. In cut-off apparatus, a frame having a stock feed passage and an associated guideway, cutter means for severing stock being advanced in said passage including a cutter slide movable in said guideway and having an operating cycle comprising a cutting stroke and a return stroke, means for actuating said slide, a stock gauge spaced from said cutter means and being engageable and movable by said stock, means responsive to the movement of said gauge by said stock for rendering the slide actuating means effective, means responsive to the slide actuating means for causing stopping of said slide upon the completion of each such operating cycle thereof, an axially movable rod means connected with said stock gauge and having spaced abutment elements thereon, yoke means comprising a pair of straps straddling said rod means between said abutment elements, links swingably connected with said frame and said straps and mounting the latter for movement from an initial stop position to a release position, and means connecting said straps with said slide for actuation by movement of the latter, one of said abutment elements being spaced from said straps when the latter are in said stop position to permit limited movement of said gauge by said stock and the other of said abutment elements being engageable by said straps for imparting a stock disengaging movement to said gauge by the movement of said straps to said release position.

4. In cut-off apparatus, a frame having a stock feed passage and an associated guideway, cutter means for severing stock being advanced in said passage including a cutter slide movable in said guideway and having an operating cycle comprising a cutting stroke and a return stroke, means for actuating said slide, a stock gauge having an initial spaced relation from said cutter means and being engageable and movable by said stock, means responsive to the movement of said gauge by said stock for rendering the slide actuating means effective, means responsive to said slide actuating means for causing stopping of said slide upon the completion of each such operating cycle thereof, an axially movable rod means connected with said stock gauge and having spaced abutment elements thereon, yoke means comprising a pair of straps straddling said rod between said abutment elements, links swingably connected with said frame and said straps and mounting the latter for movement from an initial stop position to a release position, means connecting said straps with said slide for actuation by the movement of the latter, one of said abutment elements being spaced from said straps when the latter are in said stop position to permit limited movement of said gauge by said stock and the other of said abutment elements being engageable by said straps for imparting stock disengaging movement to said gauge by the movement of said straps to said release position, and spring means effective to impart a return axial movement to said rod means to the extent permitted by said straps when the latter are in said stop position for restoring said gauge to its initial position.

5. In cut-off apparatus, a frame having a stock feed passage and an associated guideway, feed means for advancing stock along said passage, cutter means for severing said stock including a cutter slide movable in said guideway, means for actuating said slide including a rotatable shaft, a stock gauge spaced from said cutter means and being engageable and movable by said stock, an axially movable rod means connected with said stock gauge and having spaced abutment elements thereon, a bearing guidably supporting said rod means adjacent said abutment elements, pivot members on opposite sides of said bearing, links swingable on said pivot members, yoke means comprising strap members supported by said links and extending between said abutment elements in straddling relation to said rod means, means connecting said yoke means with said slide for actuation by the latter from an initial stop position to a release position, one of said abutment elements being spaced from said yoke means when the latter is in said initial stop position to permit limited movement of said gauge by said stock and the other abutment element being engageable by said yoke means for causing said gauge to be shifted away from the stock by movement of said yoke means to said release position, means for starting and stopping said shaft comprising a clutch means and a brake means associated therewith, and control means for rendering said clutch means and said brake means effective and ineffective including a first switch device responsive to the movement of said gauge by said stock and a second switch device responsive to rotation of said shaft.

6. Cut-off apparatus as defined in claim 5 and which includes spring means for causing a return axial movement of said rod means whereby said one abutment element is maintained in spaced relation to said yoke means when the latter is in its initial stop position.

7. Cut-off apparatus as defined in claim 5 in which said rod means comprises a screw and is rotatable for adjusting the spacing of said gauge from said cutter means, and in which said first switch device is rendered responsive to movement of said gauge by a swingable lever having a yoke portion embracing said rod means.

8. Cut off apparatus as defined in claim 5 in which said second switch device is rendered responsive to rotation of said shaft by a cam means driven by said shaft and a follower means cooperating with said cam means.

References Cited in the file of this patent

UNITED STATES PATENTS

| | | |
|---|---|---|
| 445,294 | Treat | Jan. 27, 1891 |
| 1,288,402 | Gale | Dec. 17, 1918 |
| 1,690,503 | Rhodes | Nov. 6, 1928 |
| 1,984,710 | Thomas | Dec. 18, 1934 |
| 2,325,139 | Leguillon | July 29, 1943 |
| 2,507,448 | McLaughlin | May 9, 1950 |
| 2,507,452 | Moore | May 9, 1950 |
| 2,569,197 | Royer | Sept. 25, 1951 |
| 2,572,137 | Grieder | Oct. 23, 1951 |